United States Patent
Larsson

(10) Patent No.: US 10,669,148 B2
(45) Date of Patent: Jun. 2, 2020

(54) FUEL BLENDING HOSE AND FUEL DISPENSING UNIT

(71) Applicant: Wayne Fueling Systems Sweden AB, Malmo (SE)

(72) Inventor: Bengt I. Larsson, Skivarp (SE)

(73) Assignee: Wayne Fueling Systems Sweden AB, Malmo (SE)

( * ) Notice: Subject to any disclaimer, the term of this patent is extended or adjusted under 35 U.S.C. 154(b) by 39 days.

(21) Appl. No.: 15/927,206

(22) Filed: Mar. 21, 2018

(65) Prior Publication Data

US 2018/0208451 A1    Jul. 26, 2018

Related U.S. Application Data

(62) Division of application No. 14/853,296, filed on Sep. 14, 2015, now Pat. No. 9,957,151.

(51) Int. Cl.
| | |
|---|---|
| *B67D 7/04* | (2010.01) |
| *B67D 7/38* | (2010.01) |
| *B01F 5/04* | (2006.01) |
| *B01F 5/06* | (2006.01) |
| *B67D 7/74* | (2010.01) |
| *B67D 7/42* | (2010.01) |

(Continued)

(52) U.S. Cl.
CPC ............. *B67D 7/38* (2013.01); *B01F 5/0451* (2013.01); *B01F 5/0651* (2013.01); *B67D 7/04* (2013.01); *B67D 7/42* (2013.01); *B67D 7/74* (2013.01); *B67D 7/84* (2013.01); *F16L 11/22* (2013.01); *B67D 2007/0425* (2013.01); *B67D 2007/0426* (2013.01); *B67D 2007/746* (2013.01)

(58) Field of Classification Search
CPC .............. B67D 7/38; B67D 2007/0425; B67D 2007/0426; B67D 2007/746; B67D 7/04; B67D 7/42; B67D 7/74; B01F 5/0451; B01F 5/0651
See application file for complete search history.

(56) References Cited

U.S. PATENT DOCUMENTS

| | | |
|---|---|---|
| 3,590,890 A | 7/1971 | Young |
| 4,978,029 A | 12/1990 | Furrow et al. |

(Continued)

FOREIGN PATENT DOCUMENTS

| | | |
|---|---|---|
| DE | 19645695 A1 | 5/1998 |
| EP | 0825149 A1 | 2/1998 |

(Continued)

OTHER PUBLICATIONS

European Search Report corresponding to European Patent Application No. 15184872.8, dated Mar. 24, 2016, 5 pages.

*Primary Examiner* — P. Macade Nichols
(74) *Attorney, Agent, or Firm* — Mintz Levin Cohn Ferris Glovsky and Popeo, P.C.

(57) ABSTRACT

A fuel hose for delivering multiple-grades of fuel is provided and in one embodiment includes a first hose portion having a first length and a first diameter, and a second hose portion having a second length and a second diameter. The first hose portion includes a first fuel line and a second fuel line, and the second hose portion includes a third fuel line. The first fuel line and the second fuel line can be fluidly connected to the third fuel line. In one embodiment, the first diameter of the first hose portion is larger than the second diameter of the second hose portion. The invention further relates to a fuel dispensing unit.

14 Claims, 1 Drawing Sheet

(51) Int. Cl.
*B67D 7/84* (2010.01)
*F16L 11/22* (2006.01)

(56) References Cited

U.S. PATENT DOCUMENTS

| 5,042,537 A | 8/1991 | Grantham |
| 5,908,055 A | 6/1999 | Baumann et al. |
| 2008/0169037 A1 | 7/2008 | Ziegler |
| 2010/0147901 A1 | 6/2010 | Larsson et al. |
| 2017/0082224 A1 | 3/2017 | Larsson et al. |

FOREIGN PATENT DOCUMENTS

| EP | 2196718 A1 | 6/2010 |
| GB | 2347665 A | 9/2000 |

FUEL BLENDING HOSE AND FUEL DISPENSING UNIT

CROSS-REFERENCE TO RELATED APPLICATIONS

This application is a divisional application of U.S. patent application Ser. No. 14/853,296, entitled "Fuel Blending Hose and Fuel Dispensing Unit," filed on Sep. 14, 2015, which claims priority to Swedish Patent Application No. 1451099-4, filed on Sep. 18, 2014, which are hereby incorporated by reference in their entireties.

FIELD

The invention relates to a fuel hose for delivering multiple-grades of fuel, and a fuel dispensing unit having such a fuel hose.

BACKGROUND ART

Some fuel dispensing systems include multiple-grade fuel sources with single or multiple fuel outlets for dispensing various grades of fuel. Each fuel source may include a pump to dispense the fuel from its source to its respective meter for measuring the volume of fuel. The fuel then remains in its original concentration or it is blended with other fuels to form a separate concentration before reaching the fuel outlet. A problem with these systems occurs when a single fuel outlet or fuel line dispenses multiple grades of fuel. Lower grades of fuel can remain in the system while the user attempts to obtain a higher grade of fuel. This contamination can often present a lower grade of fuel than required. One solution is to leave the lower grade of fuel in the system and combine it with higher grade, hoping that the combination would have sufficient grade to satisfy state and federal regulations. However, this can be disadvantageous for users who only dispense a small volume of fuel since the volume within the system creates a large variation on the grade of the fuel and places a design limitation on the system due to the small volume. Another solution is to place residual high grade fuel in the system in order to compensate for the lower grade fuel previously dispensed. However, this can complicate the system and fail to give the user the expected grade of fuel when the highest grade has been selected or a small volume is desired.

U.S. Pat. No. 5,908,055 discloses a fuel dispenser for dispensing different types of fuel. The fuel dispenser has a dispenser housing and a fuel pumping unit for each type of fuel to be dispensed mounted in the dispenser housing. The fuel dispenser further has a hose comprising three separate fuel lines for dispensing three various grades of fuel. A problem with such a hose is that it requires a large diameter which makes the hose inflexible. Another problem is that since the fuel lines will have to be small in order to fit within the hose, the fuel flow rate in said fuel lines will be limited.

SUMMARY

It is an objective of the present invention to provide an improvement of the above technique and prior art. More particularly, it is an objective of this invention to provide an improved fuel hose for dispensing several different grades of fuel with minimal contamination.

According to a first aspect, these and other objects, and/or advantages that will be apparent from the following description of embodiments, are achieved, in full or at least in part, by a fuel hose for delivering multiple-grades of fuel, comprising a first hose portion having a first length and a first diameter, and a second hose portion having a second length and a second diameter. The first hose portion comprises a first fuel line and a second fuel line, and the second hose portion comprises a third fuel line, the first fuel line and the second fuel line being fluidly connected to the third fuel line. The fuel hose is characterized in that the first diameter of the first hose portion is substantially larger than the second diameter of the second hose portion. The fuel lines are separated in the first hose portion and the problem of contamination is therefore limited to the second hose portion. The fuel hose is further advantageous in that the second diameter of the second hose portion, which is the hose portion that is moved around and bended by the user during refueling, is smaller than the diameter of the first hose portion. This allows the first hose portion to accommodate a plurality of fuel lines while the second hose portion (accommodating one fuel line only) will be kept flexible and user-friendly due to its smaller diameter. Further, the larger diameter of the first hose portion may accommodate fuel lines having a diameter that provides for a satisfying fuel flow rate in the fuel hose.

The first length of the first hose portion may be longer than the second length of the second hose portion. This is advantageous in that the part of the hose that risks contaminating the fuel, when a user attempts to obtain a higher grade of fuel and there are remains of lower grades of fuel left in the hose, will be kept to a minimum. The fuel lines are separated in the first hose portion and the problem of contamination is therefore limited to the second hose portion, which portion has a length smaller than the length of the first hose portion.

In one preferred embodiment of the invention, the first fuel line may be adapted to deliver a fuel of a first grade, the second fuel line is adapted to deliver a fuel of a second grade, and the third fuel line is adapted to deliver a fuel of the first grade, the second grade or a mix of the first grade and the second grade. The first grade may be 92 octane, the second grade may be 98 octane, and the mix of the first grade and the second grade may be 95 octane.

The first fuel line and the second fuel line may be coaxially arranged in the first hose portion, which is a space efficient solution that helps keeping the first diameter of the first hose portion to a minimum.

The fuel hose may further comprise a vapor recovery line extending within the first hose portion and the second hose portion. The vapor recovery is performed by a system which is incorporated in the fuel dispensing unit, such that vapor of hydrocarbons are prevented from escaping to the environment outside the tank of the motor vehicle. The vapor recovery line, the first fuel line and the second fuel line is preferably coaxially arranged in the first hose portion of the fuel hose, and the vapor recovery line and the third fuel line is preferably coaxially arranged in the second hose portion of the fuel hose.

The first hose portion may substantially extend from a top section of a fuel dispensing unit to a bottom section of the fuel dispensing unit, and the second hose portion may substantially extend from the bottom section of the fuel dispensing unit to a mid-section of the fuel dispensing unit. This way, the part of the fuel hose with the smaller diameter (i.e. the second hose portion) will constitute the part of the fuel hose that is moved around and bended by the user during refueling. In turn, the fuel hose will be flexible and user-friendly. Preferably, the first length of first hose portion constitutes at least 4/7 of the entire length of the fuel hose.

Naturally, other configurations of the fuel hose are possible. For example, the first hose portion may substantially extend from the mid-section of the fuel dispensing unit to the top section of the fuel dispensing unit and from the top section of the fuel dispensing unit to the bottom section of the fuel dispensing unit, and the second hose portion may substantially extend from the bottom section of the fuel dispensing unit to the mid-section of the fuel dispensing unit.

The first hose portion may be connected to the second hose portion by means of a connection means, or the first hose portion and the second hose portion may be integrally formed. Both are preferred embodiments of the invention.

According to a second aspect, these and other objects are achieved, in full or at least in part, by a fuel dispensing unit for refueling a vehicle, comprising a fuel hose according to the features described above.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

As used herein, the term "diameter" refers to the inner diameter of the fuel hose.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals may be used for similar elements, and wherein.

DETAILED DESCRIPTION

Figure 1A:
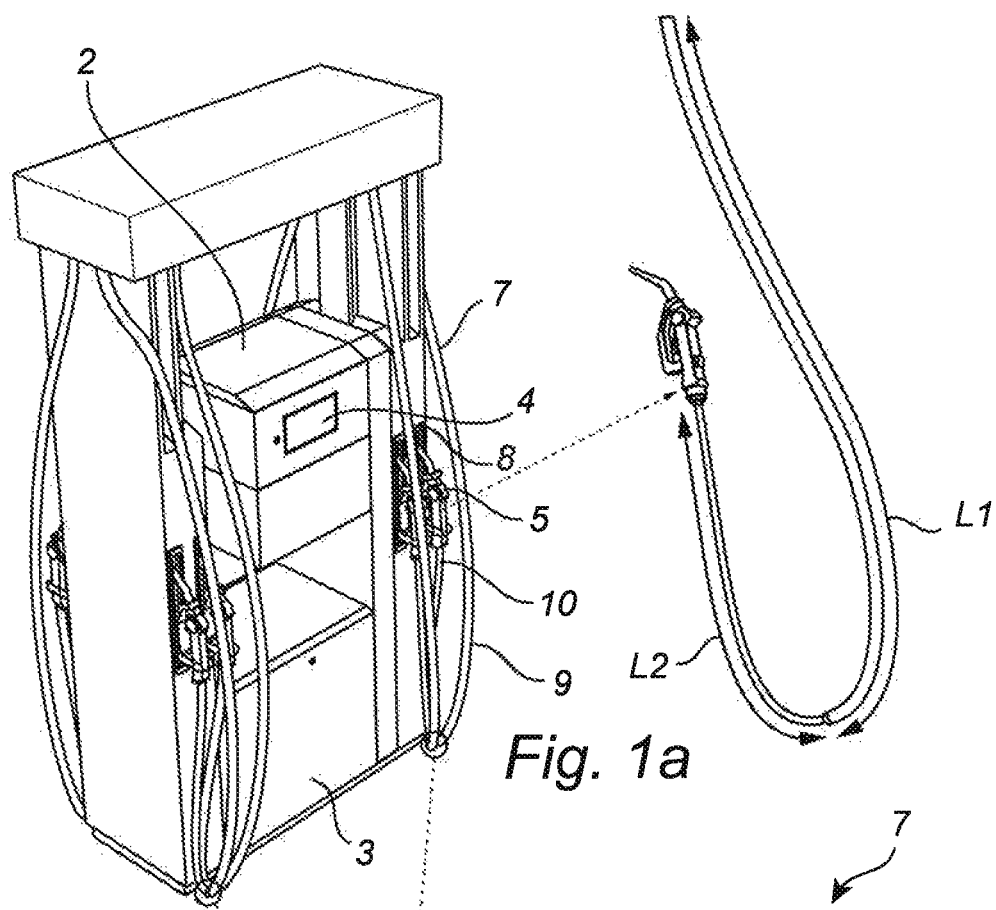
FIG. 1A is a perspective view of a fuel dispensing unit according to one exemplary embodiment of the second aspect of the invention.

FIG. 1A illustrates a fuel dispensing unit 1 for refueling motor vehicles. The fuel dispensing unit 1 has an electrical cabinet 2 containing all the electronics for the fuel dispensing unit 1, a hydraulic cabinet 3 containing fuel dispensing means (not shown), e.g. fuel metering means, valves, vapor recovery system etc., a pump display 4 showing pump data, and a payment terminal (not shown). The fuel dispensing unit 1 is connected to an underground reservoir (not shown) containing fuel. When filling up the tank of a motor vehicle, the fuel is pumped from the underground reservoir by means of a pump (not shown) which is located in the hydraulic cabinet 3, and from there to a nozzle 5 via a fuel pipe (not shown) and a fuel hose 7. When filling-up does not take place, the fuel hose 7 hangs along the fuel dispensing unit 1, and the nozzle 5 is inserted in a nozzle boot 8.

Figure 1B:
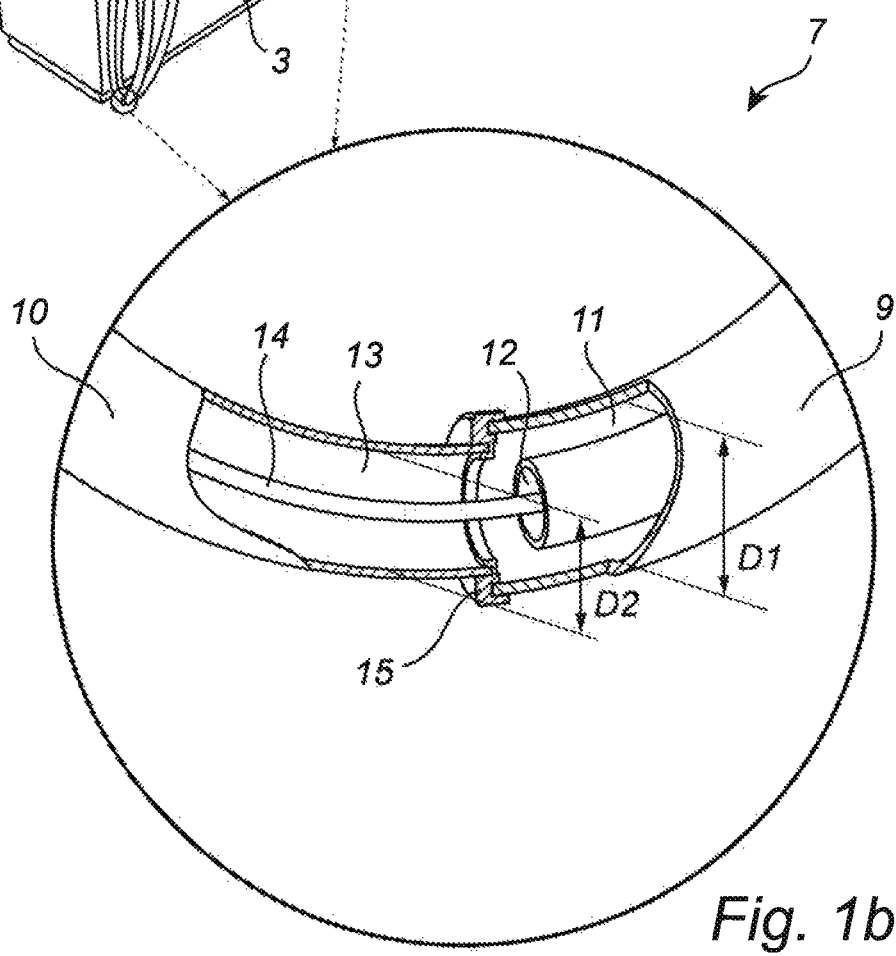
FIG. 1B is a perspective view of a fuel hose according to one exemplary embodiment of the first aspect of the invention.

In FIG. 1B, a section of the fuel hose 7 is illustrated in an enlarged view. The fuel hose 7 is adapted for delivering multiple-grades of fuel and comprises a first hose portion 9 having a first length L1 and a first diameter D1, and a second hose portion 10 having a second length L2 and a second diameter D2. The first hose portion 9 comprises a first fuel line 11 and a second fuel line 12 which are coaxially arranged, and the second hose portion 9 comprises a third fuel line 13. The first fuel line 11 and the second fuel line 12 are in fluid communication with the third fuel line 13. The first length L1 of the first hose portion 9 is longer than the second length L2 of the second hose portion 10, and the first diameter D1 of the first hose portion 6 is larger than the second diameter D2 of the second hose portion 10. The first fuel line 11 is adapted to deliver a fuel of a first grade (such as 92 octane), the second fuel line 12 is adapted to deliver a fuel of a second grade (such as 98 octane), and the third fuel line is adapted to deliver a fuel of the first grade, the second grade or a mix (such as 95 octane) of the first grade and the second grade. In the latest case, fuel of the first grade is delivered through the first fuel line 11 simultaneously as the fuel of the second grade is delivered through the second fuel line 12. The fuel of the first grade and the fuel of the second grade are then mixed in the third fuel line 13 before reaching the nozzle 5. The fuel hose 7 further comprises a vapor recovery line 14 which extend along the entire length of the fuel hose 7. When filling the tank of a motor vehicle, it is a common measure to recover the vapor escaping the tank when filling it with liquid fuel from the fuel dispensing unit 1. The vapor recovery is performed by a system which is incorporated in the fuel dispensing unit 1, such that vapor of hydrocarbons are prevented from escaping to the environment outside the tank of the motor vehicle. Such a vapor recovery system typically consists of a vapor pump (not shown), a flow meter (not shown) and a vapor inlet (not shown) arranged at the nozzle 5. The recovered vapor is returned to the underground fuel reservoir. The vapor pump draws fuel vapor from the tank of the motor vehicle, through the vapor flow meter, and down to the fuel reservoir.

The first hose portion 9 and the second hose portion 10 are connected to each other by means of a connections means 15. The connections means 15 consists of a joint manufactured by metal which joins the two portions together. The first hose portion 9 extends substantially from the top section of the fuel dispensing unit 1 and downwards, in a vertical direction, to the bottom section of the fuel dispensing unit 1. The first hose portion 9 extends substantially from the bottom section of the fuel dispensing unit 1 and upwards, in a vertical direction, to the mid-section of the fuel dispensing unit 1. The first hose portion 9 is merely used for transport of fuel and fuel vapor and has no requirements regarding flexibility and mobility, while the second hose portion 10, which is the portion of the fuel hose 7 that is moved around by a user when refueling a vehicle, must fulfill certain requirements regarding flexibility and mobility. In view thereof, the first diameter D1 of the first hose portion 9 can be allowed to be larger than the second diameter D2 of the second hose portion 10. In an exemplary embodiment of the fuel hose 7, the first length L1 of the first hose portion is approximately 1.9 meters and the first diameter D1 of the first hose portion is approximately 25 mm, while the second length L2 of the second hose portion is approximately 1.3 meters and the second diameter D2 of the second hose portion is approximately 20 mm.

The skilled person realizes that a number of modifications of the embodiments described herein are possible without departing from the scope of the invention, which is defined in the appended claims.

For instance, the first hose portion and the second hose portion may be integrally formed.

The lengths and diameters of the first and second hose portions may be varied.

The connection means may be manufactured of any suitable material and may be of any suitable size and shape.

The number of fuel lines (and the lengths and diameters of the same) in the fuel hose may be varied.

The fuel hose may be used in a fuel dispensing unit having a hose handling device. In this case, at least a portion of the fuel hose is housed within the fuel dispensing unit and the extraction and retraction of the fuel hose from the fuel dispensing unit is handled by the hose handling device.

The invention claimed is:

1. A method for dispensing multiple grades of fuel, comprising:
activating a fuel dispenser to cause a first fuel grade to flow through a first fuel line in a first hose portion of a fuel hose, and to cause a second fuel grade to flow through a second fuel line in the first hose portion, the first hose portion extending from a top section of the fuel dispenser to a bottom section of the fuel dispenser, and the first and second fuel grades flowing from the first hose portion into a third fuel line of a second hose portion of the fuel hose to thereby form a blended fuel grade, the second hose portion being coupled to an end of the first hose portion at a first end of the second hose portion and extending from the bottom section of the fuel dispenser to a mid-section of the fuel dispenser to deliver the blended fuel grade to a nozzle, the nozzle coupled to a second end of the second hose portion for delivering the blended fuel grade into a vehicle of a user.

2. The method of claim 1, wherein a vapor from the first and second fuel grades is captured by a vapor recovery line extending through the first and second hose portions.

3. The method of claim 1, wherein the first hose portion has a length that is greater than a length of the second hose portion.

4. The method of claim 3, wherein the first length of the first hose portion constitutes at least 4/7 of an entire length of the first and second hose portions combined.

5. The method of claim 1, wherein the first fuel line and the second fuel line are coaxially arranged in the first hose portion.

6. The method of claim 1, wherein the first hose portion is connected to the second hose portion by a connection means.

7. The method of claim 1, wherein the first hose portion extends substantially vertically downward from the top section of the fuel dispenser to the bottom section of the fuel dispenser and extends substantially vertically upward to the mid-section of the fuel dispenser.

8. A method for dispensing multiple grades of fuel, comprising:
activating a fuel dispenser to cause a first fuel grade to flow through a first fuel line in a first hose portion and to cause a second fuel grade to flow through a second fuel line in the first hose portion, the second fuel line concentrically aligned within the first fuel line and having an outer diameter that is less than an inner diameter of the first fuel line such that the first fuel grade flows along an exterior surface of the second fuel line, the first and second fuel grades flowing from the first hose portion into a third fuel line of a second hose portion to thereby form a blended fuel grade, the second hose portion having a first end coupled to the first hose portion through a joint, and a second end coupled to a nozzle for delivering the blended fuel grade into a vehicle of a user.

9. The method of claim 8, wherein a vapor from the first and second fuel grades is captured by a vapor recovery line extending through the first and second hose portions.

10. The method of claim 9, wherein the vapor recovery line is disposed inside the second fuel line.

11. The method of claim 9, wherein the vapor recovery line is disposed inside the third fuel line.

12. The method of claim 8, wherein the first hose portion has a length that is greater than a length of the second hose portion.

13. The method of claim 12, wherein the first length of the first hose portion constitutes at least 4/7 of an entire length of the first and second hose portions combined.

14. The method of claim 8, wherein the first hose portion extends substantially vertically downward from a top section of the fuel dispenser to a bottom section of the fuel dispenser and extends substantially vertically upward to a mid-section of the fuel dispenser.

* * * * *